United States Patent Office 2,770,625
Patented Nov. 13, 1956

2,770,625

ANTHRAQUINONE DYESTUFFS

Fritz Baumann, Leverkusen-Bayerwerk, Germany, assignor to Farbenfabriken Bayer Aktiengesellschaft, Leverkusen, Germany, a corporation of Germany No Drawing. Application July 19, 1954,
Serial No. 444,351

Claims priority, application Germany July 21, 1953

5 Claims. (Cl. 260—261)

This invention relates to new anthroquinone dyestuffs and to a process of making the same.

It is known (see U. S. Patent 2,628,963) to produce anthraquinone dyestuffs by partially hydrolyzing 1,4-diamino-anthraquinone-2,3-dinitrile to form the dicarboximide and reacting the latter with aliphatic amines. These anthraquinone dyestuffs are suitable for dyeing synthetic fibers, but have unsatisfactory alkali and chlorine fastness.

It is an object of the present invention to provide new anthraquinone dyestuffs. Another object is to provide anthraquinone dyestuffs of excellent fastness to alkali and chlorine. Further objects will appear hereinafter.

These objects are attained in accordance with the present invention by partially hydrolyzing 1,4-diamino-anthraquinone-2,3-dinitrile or substitution products thereof with concentrated sulfuric acid and reacting the hydrolysis product with an aromatic mono- or diamine.

Aromatic mono- and diamines which are suitable for the process of the invention include aniline, $\alpha$- and $\beta$-naphthylamine, the isomeric aminoanthracenes, $\alpha$- and $\beta$- amino-anthroquinone, the isomeric diamino-benzenes, the naphthylene-diamines, such as 1,8-naphthylene-diamine, benzidine, and substitution products thereof.

In practising the process of the invention, 1,4-diamino-anthraquinone-2,3-dinitrile or a substitution product thereof is treated with concentrated sulfuric acid at slightly elevated temperature to form the carboximide. Upon recovery from the hydrolysis mixture, the carboximide is reacted with the aromatic mono- or diamine at a temperature ranging from about 150° to about 250° C. This reaction is preferably carried out in an inert diluent, such as naphthalene. The dyestuff formed crystallizes from the reaction mixture and is recovered therefrom by filtration, if desired, upon adding a suitable solvent, such as pyridine, nitrobenzene, chlorobenzene and toluene.

The new dyestuffs obtainable by the process of the invention exhibit excellent fastness to alkali, chlorine and light.

The following examples, in which all parts are by weight, are for the purpose of illustrating the invention without in any way limiting it.

Example 1

170 parts of sulfuric acid monohydrate are placed in a flask. Then 12 parts of 1,4-diamino-anthraquinone-2,3-dinitrile are introduced while stirring. During the addition of the dinitrile the temperature rises to about 30°–35° C. Upon closing the flask, stirring is continued at this temperature for another 2–3 hours. The hydrolysis is finished when a sample dissolves in 90% sulfuric acid with a red color and a sample poured onto ice and washed with water dissolves in dilute sodium hydroxide solution with blue color, respectively. The hydrolysis mixture is worked up by pouring onto 1500 parts of ice and water, filtering with suction and washing with water until the filtrate becomes neutral. The precipitate is then washed with acetone and dried. The product is insoluble in soda solution, forms a violet vat and contains 15.97% nitrogen. It may be recrystallized from quinoline.

4 parts of the hydrolysis product are added at 180° C. to a solution of 8 parts of 1,8-naphthylene-diamine in 40 parts of fused naphthalene. The mixture is then boiled for ½ hour. During the reaction part of the dyestuff formed crystallizes from the mixture, ammonia being evolved. The mixture is cooled to about 120° C. and upon addition of 50 parts of pyridine the dyestuff, which crystallizes in long, blue needles, is filtered off with suction at about 100° C. The precipitate is washed with pyridine and subsequently with methanol until the filtrate becomes colorless.

The dyestuff is almost insoluble in 78% sulfuric acid; in 90% sulfuric acid it dissolves with a dull violet color; in 96% sulfuric acid a green solution is formed which turns blue upon standing for a short while. The dyestuff is poorly soluble in pyridine, but may be recrystallized from quinoline. The dyestuff is likely to have the following structural formula which is supported by the analysis.

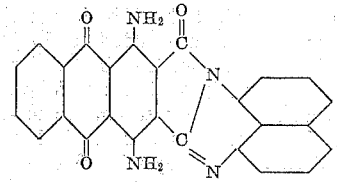

Calculated for $C_{26}H_{14}N_4O_3$: $C=72.56\%$; $H=3.25\%$; $N=13.02\%$; $O=11.16\%$.
Found: $C=72.88\%$; $H=3.36\%$; $N=12.20\%$; $O=11.25\%$.

A paste made from the dyestuff and 90% sulfuric acid at 5° C. dyes cotton in blue shades. The dyeings are very fast to chlorine and to a boiling soda solution. The fastness to light is excellent.

Example 2

6 parts of the hydrolysis product obtained in accordance with the procedure described in Example 1 are refluxed for about ½ hour with 1.8 parts of benzidine in 80 parts of naphthalene. The poorly soluble reaction product precipitates during the reaction. The reaction mixture is diluted with pyridine or nitrobenzene and the precipitate is then sucked off from the hot solution. The reaction may also be effected in the presence of a condensing agent, such as p-toluene sulfonic acid.

The dyestuff is only poorly soluble in high-boiling organic solvents and may be purified by boiling with ethylcarbazole. It is soluble in 96% sulfuric acid with a yellow-brown color and in 90% sulfuric acid with a red color. It dyes cotton in a strong gray shade of excellent light fastness.

Example 3

31 parts of the hydrolysis product obtained as described in Example 1 are refluxed in naphthalene for several hours with the same amount of $\beta$-anthramine in the presence of p-toluene sulfonic acid. The precipitated gray-black dyestuff is diluted with solventnaphtha and isolated by filtration. The dyestuff dyes cotton in a gray shade.

Other dyestuffs may be prepared by using the amino compound aniline, chloraniline, $\alpha$- or $\beta$-naphthylamine or p-amino-acetanilide.

Example 4

6 parts of the hydrolysis product of 1,4-diamino-2,3-dicyano-6,7-dichloro-anthraquinone obtained in accordance with the procedure described in Example 1 and 24 parts of 1,8-naphthylene-diamine are refluxed in 60 parts of naphthalene for 45 minutes. The precipitated dyestuff is worked up as described in Example 1 and may be recrystallized from quinoline, whereby blue-black needles are obtained which are soluble in sulfuric acid with an olive-green color. It dyes cotton from a blue vat in clear blue shades. The vat dyeings undergo no change in color when treated with soap and have an excellent fastness to chlorine.

A similar dyestuff may be obtained if the hydrolysis product of 1,4-diamino-2,3-dicyano-6-chloro-anthraquinone is used in the reaction.

Example 5

A solution of 7 parts of 1,4-diamino-2,3-dicyano-5-nitro-anthraquinone in 100 parts of 5% fuming sulfuric acid is stirred for about 3 hours at 30° C. The reaction is interrupted when a sample on dilution with 78% sulfuric acid turns blue when formaldehyde is added and when this blue color turns reddish-brown after a short while. The color of the vat shall be blue.

Thereafter the reaction mixture is poured onto ice-water. The precipitate is sucked off, and washed with cold water until the filtrate becomes neutral. It is then washed with methanol and acetone and dried.

6 parts of the product thus obtained and 9 parts of 1,8-naphthylene-diamine are added to 60 parts of boiling naphthalene and the melt is boiled for 15 minutes. The resultant dyestuff is worked up, following the procedure of Example 1. It is soluble in ice-cold sulfuric acid with violet color. As a paste it has a blue-gray color. The dyestuff dyes vegetable fibers from a green-blue vat with blue-gray shades. Before the treatment with soap, the dyeings are greenish-blue.

Example 6

10 parts of 1,4-diamino-anthraquinone-2,3-dicarboxylic acid anhydride and 25 parts of 1,8-naphthylene-diamine are refluxed in 120 parts of naphthalene until the reaction is complete. The dyestuff is then worked up as described in Example 1. It is identical with the dyestuff obtained in Example 1.

The 1,4-diamino-anthraquinone-2,3-dicarboxylic acid anhydride may be obtained by heating 1,4-diamino-anthraquinone-2,3-dicarboximide or 1,4 - diamino - 2,3 - dicyano-anthraquinone with sulfuric acid of 60° Bé. at a temperature of 160–165° C.

I claim:

1. An anthraquinone dyestuff obtained by partial hydrolysis of a member selected from the group consisting of 1,4-diamino-anthraquinone-2,3-dinitrile chloro-substituted 1,4-diamino-anthraquinone-2,3-dinitrile and nitro-substituted 1,4 - diamino - anthraquinone-2,3-dinitrile with sulfuric acid to form the carboximide and reaction of said carboximide with a member selected from the group consisting of benzidine, 1,8-naphthylene-diamine and β-anthramine.

2. An anthraquinone dyestuff obtained by partial hydrolysis of 1,4-diamino-anthraquinone-2,3-dinitrile with sulfuric acid to form the carboximide and reaction of said carboximide with a member selected from the group consisting of benzidine, 1,8-naphthylene-diamine and β-anthramine.

3. The anthraquinone dyestuff following structural formula:

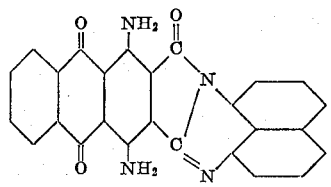

obtained by partial hydrolysis of 1,4-diamino-anthraquinone-2,3-dinitrile with sulfuric acid to form the carboximide and reaction of said carboximide with 1,8-naphthylene-diamine.

4. Process for the production of anthraquinone dyestuffs, which comprises contacting a member selected from the group consisting of 1,4-diamino-anthraquinone-2,3-dinitrile, chloro-substituted 1,4-diamino anthraquinone-2,3-dinitrile, cyano-substituted 1,4-diamino-anthraquinone-2,3-dinitrile and nitro-substituted 1,4-diamino-anthraquinone-2,3-dinitrile with sulfuric acid at a temperature ranging from about 20°–35° C., recovering from the reaction mixture a hydrolysis product, heating said hydrolysis product with a member selected from the group consisting of benzidine, 1,8-naphthylene diamine and β-anthramine to a temperature ranging from about 150° to about 250° C. and recovering the anthraquinone dyestuff thus obtained from the reaction mixture.

5. Process in accordance with claim 4, in which said heating of said hydrolysis product with a member selected from the group consisting of benzidine, 1,8-naphthylene diamine and β-anthramine is carried out in naphthylene.

References Cited in the file of this patent
UNITED STATES PATENTS 2,628,963   Laucius et al. _____ Feb. 17, 1953

FOREIGN PATENTS 414,262   Germany _____ May 27, 1925